United States Patent [19]

Henry et al.

[11] Patent Number: 4,902,086

[45] Date of Patent: Feb. 20, 1990

[54] DEVICE INCLUDING A SUBSTRATE-SUPPORTED OPTICAL WAVEGUIDE, AND METHOD OF MANUFACTURE

[75] Inventors: Charles H. Henry, Skillman; Roland A. Levy, Berkeley Heights, both of N.J.

[73] Assignee: AT&T Bell Laboratories, Murray Hill, N.J.

[21] Appl. No.: 163,687

[22] Filed: Mar. 3, 1988

[51] Int. Cl.[4] ............................................. G02B 6/10
[52] U.S. Cl. ............................... 350/96.12; 350/96.29
[58] Field of Search ........................... 350/96.11–96.15, 350/96.29

[56] References Cited

U.S. PATENT DOCUMENTS 4,695,123  9/1987  Chang et al. ................ 350/96.29 X
4,778,237 10/1988  Sorin et al. ................... 350/96.29 X

OTHER PUBLICATIONS

*Journal of the Electrochemical Society*, vol. 132 (1985), "Modified Phosphosilicate Glasses for VLSI Applications", K. Nassau et al., pp. 409–415.

*Journal of Lightwave Technology*, vol. LT—4 (1986), "Ring Resonator Fabricated in Phosphosilicate Glass Films Deposited by Chemical Vapor Deposition", A. Naumaan, pp. 1294–1303.

*Primary Examiner*—John D. Lee
*Assistant Examiner*—John Ngo
*Attorney, Agent, or Firm*—Peter A. Businger

[57] ABSTRACT

In the manufacture of optical devices such as, e.g., optical communications assemblies and optical gyroscopes, low-loss substrate-supported optical waveguides are desired. Such waveguides can be obtained by patterning a layer of deposited waveguide material and, in the interest of minimizing loss as may be due to processing-induced surface roughness, waveguides as patterned preferably undergo a heat treatment which results in surface smoothing and in rounding of the waveguide cross section. Furthermore, in the interest of avoiding re-entrant corners between substrate and waveguide, a wetting layer may be applied to the waveguide prior to heat treatment.

12 Claims, 1 Drawing Sheet

DEVICE INCLUDING A SUBSTRATE-SUPPORTED OPTICAL WAVEGUIDE, AND METHOD OF MANUFACTURE

TECHNICAL FIELD

The invention is concerned with devices including a substrate-supported waveguide as may be used, e.g., in optical communications systems.

BACKGROUND OF THE INVENTION

As optical communications are gaining entry into the fields of subscriber-loop and local-area networks, increased attention is being paid to the feasibility of substrate-supported waveguides as forming predefined optical paths in couplers and between optical component devices such as, e.g., light sources and detectors on a common substrate. Considered as eminently desirable in this respect are means for forming low-loss waveguides which are suitable for side-by-side coupling.

SUMMARY OF THE INVENTION

In the manufacture of optical devices and assemblies, substrate-supported waveguides are provided for the transmission of one or, possibly, several optical modes. Preferred optical waveguides comprise a core portion on a first cladding layer, and such waveguides have a smoothed surface or core-cladding interface with an overlying second cladding layer. Furthermore, by inclusion of a core-cladding wetting layer, a preferred core profile provides for smooth transition, without re-entrant corners, between the core and the first cladding layer. Resulting waveguides can be made in close-spaced side-by-side relationship as is desirable for lateral (evanescent-field) coupling between waveguides.

DETAILED DESCRIPTION

Figure 1:
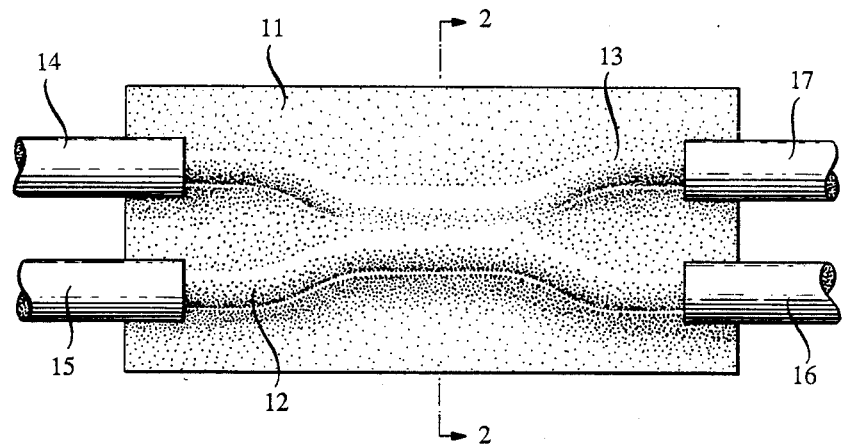
FIG. 1 is a schematic top view of an optical coupler as a preferred embodiment of the invention, including side-by-side substrate-supported waveguides.
Figure 2:
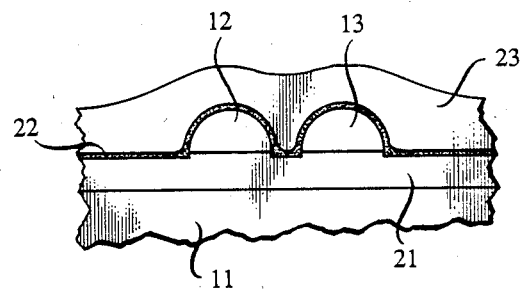
FIG. 2 is a schematic cross-sectional view of the coupler of FIG. 1.

FIG. 1 shows glass-covered silicon substrate 11, substrate-supported waveguide cores 12 and 13 (between first and second cladding layers as shown in FIG. 2), and optical fibers 14, 15, 16, and 17 aligned with waveguides 12 and 13.

FIG. 2 shows substrate 11, first waveguide cladding layer 21 on substrate 11, waveguide cores 12 and 13 on layer 21, wetting layer 22, and second cladding layer 23.

Other than silicon, materials such as, e.g., Group III–V semiconductor materials can serve as substrate materials; similarly, insulating materials such as, e.g., fused silica or ceramic materials can be used. First waveguide cladding layer 21 may be as deposited or as obtained by substrate-surface reaction; for example, in the case of a silicon substrate, layer 21 may be a "thermally grown" silicon dioxide layer as obtained by thermal oxidation of substrate surface material. (Such oxidation is favored under steam at elevated pressure.)

The material of waveguides 12 and 13 has a refractive index which, for waveguiding purposes, is higher than the refractive index of the material of layer 21. For example, when layer 21 consists essentially of silicon dioxide, the material of waveguides 12 and 13 may be a doped silica-based glass such as, e.g., phosphosilicate glass as obtained by including phosphorus pentoxide as a dopant. Among alternative dopants are germania and titanium dioxide; also, there are many suitable combinations including more than one dopant. Where substrate-supported waveguides are to be coupled to optical fibers, waveguide width and height preferably are approximately the same; for a preferred way of aligning fibers with waveguides see the patent applications designated as G. E. Blonder 10, "Device Including a Component in Alignment with a Substrate-supported Waveguide".

The material of second cladding layer 23 has a refractive index which is less than the refractive index of the waveguide core material; conveniently, the material of layer 23 may be the same as the material of layer 21. Also, layer 23 may be omitted, with air serving as low-index material vis-a-vis the waveguide core material.

For optical radiation at a wavelength at or near 1.3 micrometer (as understood to represent an approximate range from 1.2 to 1.6 micrometer), the following dimensions and materials are preferred: A silicon substrate; a silicon dioxide first cladding layer having a thickness of 10 to 15 micrometers, a phosphosilicate waveguide approximately 5 micrometers wide and 5 micrometers thick, and a silica glass second cladding layer approximately 5 micrometers thick. For other wavelengths, and especially for shorter wavelengths, dimensions may require adjustment in the interest of limitation to a desired number of optical modes. Preferred phosphosilicate glass comprises phosphorus in an amount in the range from 6 to 8 weight percent, glasses with less than 6 weight percent phosphorus having a tendency to crack, and glasses with more than 8 weight percent phosphorus tending to be hygroscopic.

Manufacture of a preferred waveguide structure involves deposition of a layer of waveguide core glass on the first cladding layer, deposition of a photolithographic resist layer on the core glass, patterning of the resist layer so as to uncover portions of core glass to be removed, removal of uncovered core glass, application of a core-cladding wetting agent, smoothing and cross-sectional rounding of the waveguide by heating, and deposition of the second cladding layer. Conveniently, deposition of core and cladding glasses may be by chemical vapor deposition, using precursor gases such as, e.g., silane, TEOS, or DABS for silica, and phosphine for phosphorus pentoxide.

Preferably, in the interest of positive control over etched waveguide thickness, a tri-level photolithographic mask layer is used, including, e.g., a plasma-deposited silica layer between two organic resist layers. Core glass exposed after photolithographic patterning of the mask layer may be removed, e.g., by chemical or reactive-ion etching, and such etching may typically result also in the removal of a small portion of the first cladding material. As etched, waveguide cross-sectional profile is essentially square or rectangular.

After waveguide etching, and prior to second cladding deposition, a waveguide smoothing step is included for the sake of longitudinal as well cross-sectional smoothing of the waveguide surface, and of cross-sectional rounding of the waveguide. In the interest of preventing re-entrant corners between the waveguide and the first cladding layer, such smoothing is preferably carried out after deposition of a wetting agent on the patterned waveguide; conveniently, the material of this layer is essentially the same as the waveguide core material.

As an alternative to deposition of waveguide core material for the purpose of forming a wetting layer, it may be possible to control waveguide etching so as to produce a wetting layer as a residual layer of waveguide core material on the underlying first cladding layer. In either case, the thickness of a wetting layer whose refractive index matches the refractive index of the waveguide core material preferably is limited in the interest of lateral confinement of radiation traveling in the resulting waveguide, and of minimization of loss to the substrate. In this respect, preferred wetting layer thickness as incorporated in the waveguide structure is less than 1 micrometer, and preferably less than 0.5 micrometer. Furthermore, where desired, wetting layer material may be removed after waveguide smoothing and prior to cladding deposition; such removal may be effected, e.g., by chemical or by reactive-ion etching.

Preferred smoothing serves to reduce processing-induced waveguide surface roughness and waviness, both of which bear directly on optical loss in waveguide use. Also, smoothing may further serve for densifying the waveguide core glass by permitting accidentally trapped gases to escape, thereby contributing to loss reduction.

Smoothing and densifying may be accomplished by raising the temperature of the waveguide material above its flow temperature, e.g., in a steam atmosphere. (Flow temperature is related to glass transition temperature; e.g., for phosphosilicate glasses, flow temperature is approximately 300° C. above the glass transition temperature. For further details in this respect see K. Nassau et al., "Modified Phosphosilicate Glasses for VLSI Applications", *Journal of the Electrochemical Society*, Vol. 132 (1985), pp. 409–415.) Also, depending on waveguide material, care is indicated so as to assure that temperature remain below a critical temperature - beyond which waveguide transparency may be affected adversely as due, e.g., to phase separation. For example, in the case of phosphosilicate glass containing 6–8 weight percent phosphorus, temperature preferably is limited to temperatures not significantly exceeding a temperature of approximately 1100° C. Following heat treatment, waveguide core glass is cooled.

On account of smooth contours and absence of re-entrant corners between the waveguide core and cladding, waveguides of the invention are particularly suitable in the manufacture of evanescent-field couplers as may be included in optical communications systems. Furthermore, in such systems, waveguides of the invention can serve for the optical interconnection of substrate-supported light sources and detectors, e.g, in two-way transmission through a common port, in star couplers, and for filters, reflectors, and resonators, e.g., in local-area network applications. (Filters, reflectors, resonators, and the like may involve the localized incorporation of diffraction gratings, e.g., at the interface between the first cladding layer and the waveguide core, or at the interface between the waveguide core and the second cladding layer.)

Among other devices contemplated are resonant ring gyroscopes where low loss in substrate-supported waveguides is particularly desirable.

EXAMPLE

On a 10-centimeter silicon substrate having a thickness of approximately 0.5 millimeter, a 10-micrometer layer of silicon dioxide was grown by high-pressure oxidation under steam. On the grown layer, an additional 5-micrometer layer of silica glass was deposited by standard low-pressure chemical vapor deposition (LPCVD), using silane and oxygen at a temperature of approximately 400° C. and a pressure of approximately 0.5 Torr (67 Pa).

On the silica layer, a phosphosilicate glass layer was deposited by the same method, further using phosphine. Phosphorus content of the deposited glass was approximately 6.5 percent by weight, and layer thickness was approximately 4 micrometers. The deposited phosphosilicate glass was densified at a temperature of approximately 1000° C. for 60 minutes in flowing nitrogen.

A 6-centimeter waveguide was etched out of the deposited phosphosilicate layer by reactive-ion etching (RIE) in the presence of a patterned tri-level mask consisting, as deposited, of a bottom layer of organic resist material approximately 3 micrometers thick, an intermediate layer of plasma-deposited silicon dioxide approximately 0.24 micrometer thick, and an organic top layer approximately 0.7 micrometer thick. As etched, waveguide width was approximately 6 micrometers.

On the etched waveguide, a 0.3-micrometer layer of phosphosilicate glass of the same composition as the core material was deposited as a wetting layer, and the resulting structure was smoothed by heating at a temperature of approximately 1100° C. for 60 minutes in flowing nitrogen. On the smoothed waveguide a 5-micrometer layer of undoped silica was deposited by low-pressure chemical vapor deposition under conditions as described above, and the deposited silica layer was densified by heating at a temperature of approximately 1000° C.

Optical loss of the waveguide was experimentally determined for 1.3-micrometer radiation; total loss, including butt-coupling input and output losses, was found to be approximately 1.2 dB. Accordingly, loss per unit length of the waveguide was less than 0.2 dB/cm.

We claim:

1. A device comprising a substrate-supported optical waveguide, said waveguide comprising a waveguide core on a portion of a first waveguide cladding layer on a substrate, characterized in that a core-cladding wetting layer is on at least a portion of said first waveguide cladding layer adjoining the interface between said waveguide core and said cladding layer, said wetting layer consisting of a material which is essentially the same as the material of said waveguide core.

2. The device of claim 1 in which the material of said wetting layer is essentially the same as the material of said waveguide core.

3. The device of claim 1 in which said substrate consists essentially of silicon.

4. The device of claim 1 in which the material of said first cladding layer consists essentially of silicon dioxide.

5. The device of claim 1 in which the material of said waveguide core consists essentially of phosphosilicate glass.

6. The device of claim 1 in which the material of said substrate consists essentially of a ceramic material.

7. The device of claim 6 in which said ceramic material is fused silica.

8. The device of claim 1, further comprising a second waveguide cladding layer on said wetting layer.

9. The device of claim 8 in which the material of said second cladding layer consists essentially of silica glass.

10. A method for making a device comprising a substrate-supported optical waveguide, said method comprising depositing a layer of waveguide core material on a layer of waveguide cladding material, selectively removing portions of said layer of core material to produce a pattern comprising said waveguide, providing a wetting layer on at least a portion of said waveguide cladding material adjacent to the interface between said cladding material and said core material, and smoothing said waveguide by heating in the presence of said wetting layer.

11. The method of claim 10 in which said wetting layer is provided by deposition.

12. The method of claim 10 in which said wetting layer is provided as a residual layer of core material after selective removal.

* * * * *